(12) United States Patent
Brubaker et al.

(10) Patent No.: US 9,482,297 B2
(45) Date of Patent: Nov. 1, 2016

(54) CONTROLLABLE COUPLING ASSEMBLY HAVING FORWARD AND REVERSE BACKLASH

(71) Applicant: Means Industries, Inc., Saginaw, MI (US)

(72) Inventors: Douglas E. Brubaker, Midland, MI (US); Brice A. Pawley, Midland, MI (US); Jeffrey J. Prout, Freeland, MI (US)

(73) Assignee: Means Industries, Inc., Saginaw, MI (US)

( * ) Notice: Subject to any disclaimer, the term of this patent is extended or adjusted under 35 U.S.C. 154(b) by 110 days.

(21) Appl. No.: 14/675,856

(22) Filed: Apr. 1, 2015

(65) Prior Publication Data

US 2016/0290417 A1 Oct. 6, 2016

(51) Int. Cl.
*F16D 41/16* (2006.01)
*F16D 41/12* (2006.01)

(52) U.S. Cl.
CPC ............. *F16D 41/16* (2013.01); *F16D 41/125* (2013.01)

(58) Field of Classification Search
CPC ....... F16D 41/12; F16D 41/125; F16D 41/16
See application file for complete search history.

(56) References Cited

U.S. PATENT DOCUMENTS

| 2,960,287 | A | 11/1960 | Barlow |
| 3,130,989 | A | 4/1964 | Lannen |
| 4,050,560 | A | 9/1977 | Torstenfelt |
| 4,056,747 | A | 11/1977 | Orris et al. |
| 4,200,002 | A | 4/1980 | Takahashi |
| 4,340,133 | A | 7/1982 | Blersch |
| 5,052,534 | A | 10/1991 | Gustin et al. |
| 5,070,978 | A | 12/1991 | Pires |
| 5,206,573 | A | 4/1993 | McCleer et al. |
| 5,231,265 | A | 7/1993 | Hackett et al. |
| 5,362,293 | A | 11/1994 | Romanauskas |
| 5,387,854 | A | 2/1995 | McCleer et al. |
| 5,394,321 | A | 2/1995 | McCleer et al. |

(Continued)

FOREIGN PATENT DOCUMENTS

GB 1007475 A 10/1965

OTHER PUBLICATIONS

Notice of Allowance and Fee(S) Due; related U.S. Appl. No. 14/675,840, filed Apr. 1, 2015; date mailed Dec. 3, 2015.

(Continued)

*Primary Examiner* — Richard Lorence
(74) *Attorney, Agent, or Firm* — Brooks Kushman P.C.

(57) ABSTRACT

A controllable or selectable coupling assembly includes a plurality of forward locking elements, at least one reverse locking element and first and second coupling members supported for relative rotation about a common rotational axis. The coupling members include a first, second and third coupling faces. The first coupling face has a set of forward pockets angularly spaced about the axis. The second coupling face has a set of reverse locking formations adapted for abutting engagement with the at least one reverse locking element. The third coupling face opposes the first coupling face and has a set of forward locking formations. Either forward backlash is a non-zero integer multiple of reverse backlash or the reverse backlash is a non-zero integer multiple of the forward backlash to prevent the coupling assembly from inadvertently binding in both directions (i.e. a "lock-lock" condition) about the axis.

21 Claims, 3 Drawing Sheets

(56) References Cited

U.S. PATENT DOCUMENTS

| | | |
|---|---|---|
| 5,449,057 A | 9/1995 | Frank |
| 5,453,598 A | 9/1995 | Hackett et al. |
| 5,597,057 A | 1/1997 | Ruth et al. |
| 5,638,929 A | 6/1997 | Park |
| 5,642,009 A | 6/1997 | McCleer et al. |
| 5,678,668 A | 10/1997 | Sink |
| 5,806,643 A | 9/1998 | Fitz |
| 5,847,469 A | 12/1998 | Tabata et al. |
| 5,856,709 A | 1/1999 | Ibaraki et al. |
| 5,871,071 A | 2/1999 | Sink |
| 5,918,715 A | 7/1999 | Ruth et al. |
| 5,927,455 A | 7/1999 | Baker et al. |
| 5,954,174 A | 9/1999 | Costin |
| 5,964,331 A | 10/1999 | Reed et al. |
| 5,979,627 A | 11/1999 | Ruth et al. |
| 6,019,699 A | 2/2000 | Hoshiya et al. |
| 6,065,576 A | 5/2000 | Shaw et al. |
| 6,075,302 A | 6/2000 | McCleer |
| 6,116,394 A | 9/2000 | Ruth |
| 6,125,980 A | 10/2000 | Ruth et al. |
| 6,129,190 A | 10/2000 | Reed et al. |
| 6,186,299 B1 | 2/2001 | Ruth |
| 6,193,038 B1 | 2/2001 | Scott et al. |
| 6,237,931 B1 | 5/2001 | Marola |
| 6,244,965 B1 | 6/2001 | Klecker et al. |
| 6,290,044 B1 | 9/2001 | Burgman et al. |
| 6,306,057 B1 | 10/2001 | Morisawa et al. |
| 6,344,008 B1 | 2/2002 | Nagano et al. |
| 6,386,349 B1 | 5/2002 | Welch |
| 6,481,551 B1 | 11/2002 | Ruth |
| 6,503,167 B1 | 1/2003 | Sturm |
| 6,505,721 B1 | 1/2003 | Welch |
| 6,571,926 B2 | 6/2003 | Pawley |
| 6,814,201 B2 | 11/2004 | Thomas |
| 6,846,257 B2 | 1/2005 | Baker et al. |
| 6,854,577 B2 | 2/2005 | Ruth |
| 6,953,409 B2 | 10/2005 | Schmidt et al. |
| 6,982,502 B1 | 1/2006 | Sendaula et al. |
| 7,025,188 B2 | 4/2006 | Lindenschmidt et al. |
| 7,093,512 B2 | 8/2006 | Ibamoto et al. |
| 7,100,756 B2 | 9/2006 | Kimes et al. |
| 7,153,228 B2 | 12/2006 | Fujiu et al. |
| 7,198,587 B2 | 4/2007 | Samie et al. |
| 7,201,690 B2 | 4/2007 | Miura et al. |
| 7,223,198 B2 | 5/2007 | Kimes et al. |
| 7,223,200 B2 | 5/2007 | Kojima et al. |
| 7,255,186 B2 | 8/2007 | Wakuta et al. |
| 7,256,510 B2 | 8/2007 | Holmes et al. |
| 7,258,214 B2 | 8/2007 | Pawley et al. |
| 7,275,628 B2 | 10/2007 | Pawley et al. |
| 7,344,010 B2 | 3/2008 | Fetting, Jr. et al. |
| 7,349,010 B2 | 3/2008 | Bryant et al. |
| 7,383,930 B2 | 6/2008 | Kimes et al. |
| 7,393,296 B2 | 7/2008 | Kano et al. |
| 7,397,296 B1 | 7/2008 | Kiani |
| 7,426,971 B2 | 9/2008 | Kano et al. |
| 7,448,481 B2 | 11/2008 | Kimes et al. |
| 7,451,862 B2 | 11/2008 | Kimes et al. |
| 7,455,156 B2 | 11/2008 | Kimes et al. |
| 7,455,157 B2 | 11/2008 | Kimes et al. |
| 7,464,801 B2 | 12/2008 | Wittkopp |
| 7,484,605 B2 | 2/2009 | Pawley et al. |
| 7,491,151 B2 | 2/2009 | Maguire et al. |
| 7,614,466 B2 | 11/2009 | Kano et al. |
| 7,621,359 B2 | 11/2009 | Kano et al. |
| 7,661,518 B2 | 2/2010 | Kimes |
| 7,690,455 B2 | 4/2010 | Kano et al. |
| 7,690,492 B2 | 4/2010 | Gooden et al. |
| 7,806,795 B2 | 10/2010 | Oba et al. |
| 7,942,781 B2 | 5/2011 | Kimes |
| 8,007,396 B2 | 8/2011 | Kimes et al. |
| 8,051,959 B2 | 11/2011 | Eisengruber |
| 8,061,496 B2 | 11/2011 | Samie et al. |
| 8,079,453 B2 | 12/2011 | Kimes |
| 8,187,141 B2 | 5/2012 | Goleski et al. |
| 8,196,724 B2 | 6/2012 | Samie et al. |
| 8,272,488 B2 | 9/2012 | Eisengruber et al. |
| 8,286,772 B2 | 10/2012 | Eisengruber |
| 8,324,890 B2 | 12/2012 | Lin |
| 8,418,825 B2 | 4/2013 | Bird |
| 8,491,439 B2 | 7/2013 | Kimes |
| 8,491,440 B2 | 7/2013 | Kimes et al. |
| 8,720,659 B2 | 5/2014 | Pawley |
| 8,813,929 B2 | 8/2014 | Kimes |
| 2002/0000724 A1 | 1/2002 | Kalargeros et al. |
| 2004/0159517 A1 | 8/2004 | Thomas |
| 2004/0216975 A1 | 11/2004 | Ruth |
| 2005/0279602 A1 | 12/2005 | Ruth |
| 2006/0021838 A1 | 2/2006 | Kimes et al. |
| 2006/0124425 A1 | 6/2006 | Fetting, Jr. et al. |
| 2006/0138777 A1 | 6/2006 | Hofbauer et al. |
| 2006/0185957 A1 | 8/2006 | Kimes et al. |
| 2006/0249345 A1 | 11/2006 | Ruth |
| 2007/0056825 A1 | 3/2007 | Fetting, Jr. et al. |
| 2007/0107960 A1 | 5/2007 | Takami et al. |
| 2007/0278061 A1 | 12/2007 | Wittkopp et al. |
| 2008/0093190 A1 | 4/2008 | Belmont |
| 2008/0110715 A1 | 5/2008 | Pawley |
| 2008/0135369 A1 | 6/2008 | Meier |
| 2008/0169165 A1 | 7/2008 | Samie et al. |
| 2008/0169166 A1 | 7/2008 | Wittkopp et al. |
| 2008/0185253 A1 | 8/2008 | Kimes |
| 2008/0188338 A1 | 8/2008 | Kimes et al. |
| 2008/0223681 A1 | 9/2008 | Stevenson et al. |
| 2008/0245360 A1 | 10/2008 | Almy et al. |
| 2009/0062058 A1 | 3/2009 | Kimes et al. |
| 2009/0084653 A1 | 4/2009 | Holmes |
| 2009/0098970 A1 | 4/2009 | Kimes |
| 2009/0127059 A1 | 5/2009 | Knoblauch |
| 2009/0133981 A1 | 5/2009 | Tarasinski et al. |
| 2009/0142207 A1 | 6/2009 | Ring et al. |
| 2009/0159391 A1 | 6/2009 | Eisengruber |
| 2009/0194381 A1 | 8/2009 | Samie et al. |
| 2009/0211863 A1 | 8/2009 | Kimes |
| 2009/0233755 A1 | 9/2009 | Kimes |
| 2009/0255773 A1 | 10/2009 | Seufert et al. |
| 2010/0071497 A1 | 3/2010 | Reisch et al. |
| 2010/0105515 A1 | 4/2010 | Goleski et al. |
| 2010/0127693 A1 | 5/2010 | Wenzel et al. |
| 2010/0200358 A1 | 8/2010 | Eisengruber et al. |
| 2010/0230226 A1 | 9/2010 | Prout |
| 2010/0252384 A1 | 10/2010 | Eisengruber |
| 2011/0233026 A1 | 9/2011 | Pawley |
| 2011/0269587 A1* | 11/2011 | Papania ............... F16D 41/125 474/148 |
| 2012/0021862 A1 | 1/2012 | Isken, II et al. |
| 2012/0145505 A1 | 6/2012 | Kimes |
| 2012/0149518 A1 | 6/2012 | Kimes |
| 2012/0152683 A1 | 6/2012 | Kimes |
| 2012/0152687 A1 | 6/2012 | Kimes et al. |
| 2012/0228076 A1 | 9/2012 | Tate, Jr. et al. |
| 2013/0062151 A1 | 3/2013 | Pawley |
| 2013/0277164 A1 | 10/2013 | Prout et al. |
| 2014/0102844 A1 | 4/2014 | Greene et al. |
| 2014/0190785 A1 | 7/2014 | Fetting et al. |
| 2014/0284167 A1 | 9/2014 | Kimes |
| 2014/0305761 A1 | 10/2014 | Kimes |
| 2015/0000442 A1 | 1/2015 | Kimes et al. |

OTHER PUBLICATIONS

International Preliminary Report on Patentability; related International application No. PCT/US2014/056716; date of issuance of report Mar. 29, 2016.

International Preliminary Report on Patentability; related International application No. PCT/US2014/056749; date of issuance of report Mar. 29, 2016.

International Preliminary Report on Patentability; related International application No. PCT/US2014/057140; date of issuance of report Mar. 29, 2016.

International Search Report and Written Opinion; related International application No. PCT/US2016/013836; date of mailing Mar. 30, 2016.

(56) References Cited

OTHER PUBLICATIONS

Notice of Allowance and Fee(S) Due; related U.S. Appl. No. 14/086,202; dated Sep. 14, 2015.
Office Action; related U.S. Appl. No. 14/675,840; dated Oct. 2, 2015.
Notice of Allowance and Fee(S) Due; related U.S. Appl. No. 14/882,505; dated Aug. 1, 2016.
Office Action; related U.S. Appl. No. 14/882,505; notification date May 19, 2016.
Notice of Allowance and Fee(S) Due; related U.S. Appl. No. 15/078,154; date mailed Sep. 12, 2016.

* cited by examiner

CONTROLLABLE COUPLING ASSEMBLY HAVING FORWARD AND REVERSE BACKLASH

TECHNICAL FIELD

This invention generally relates to controllable coupling or clutch assemblies and, in particular, to such assemblies which have forward and reverse backlash.

OVERVIEW

Coupling assemblies such as clutches are used in a wide variety of applications to selectively couple power from a first rotatable driving member, such as a driving disk or plate, to a second, independently rotatable driven member, such as a driven disk or plate. In one known variety of clutches, commonly referred to as "one-way" or "overrunning" clutches, the clutch engages to mechanically couple the driving member to the driven member only when the driving member rotates in a first direction relative to the driven member. Further, the clutch otherwise permits the driving member to freely rotate in the second direction relative to the driven member. Such "freewheeling" of the driving member in the second direction relative to the driven member is also known as the "overrunning" condition.

One type of one-way clutch includes coaxial driving and driven plates having generally planar clutch faces in closely spaced, juxtaposed relationship. A plurality of recesses or pockets is formed in the face of the driving plate at angularly spaced locations about the axis, and a strut or pawl is disposed in each of the pockets. Multiple recesses or notches are formed in the face of the driven plate and are engageable with one or more of the struts when the driving plate is rotating in a first direction. When the driving plate rotates in a second direction opposite the first direction, the struts disengage the notches, thereby allowing freewheeling motion of the driving plate with respect to the driven plate.

When the driving plate reverses direction from the second direction to the first direction, the driving plate typically rotates relative to the driven plate until the clutch engages. As the amount of relative rotation increases, the potential for an engagement noise also increases.

Controllable or selectable one-way clutches (i.e., OWCs) are a departure from traditional one-way clutch designs. Selectable OWCs add a second set of locking members in combination with a slide plate. The additional set of locking members plus the slide plate adds multiple functions to the OWC. Depending on the needs of the design, controllable OWCs are capable of producing a mechanical connection between rotating or stationary shafts in one or both directions. Also, depending on the design, OWCs are capable of overrunning in one or both directions. A controllable OWC contains an extremely controlled selection or control mechanism. Movement of this selection mechanism can be between two or more positions which correspond to different operating modes.

U.S. Pat. No. 5,927,455 discloses a bi-directional overrunning pawl-type clutch, U.S. Pat. No. 6,244,965 discloses a planar overrunning coupling, and U.S. Pat. No. 6,290,044 discloses a selectable one-way clutch assembly for use in an automatic transmission. U.S. Pat. Nos. 7,258,214 and 7,344,010 disclose overrunning coupling assemblies, and U.S. Pat. No. 7,484,605 discloses an overrunning radial coupling assembly or clutch.

A properly designed controllable OWC can have near-zero parasitic losses in the "off" state. It can also be activated by electro-mechanics and does not have either the complexity or parasitic losses of a hydraulic pump and valves.

In a powershift transmission, tip-in clunk is one of most difficult challenges due to absence of a torque converter. When the driver tips-in, i.e., depresses the accelerator pedal following a coast condition, gear shift harshness and noise, called clunk, are heard and felt in the passenger compartment due to the mechanical linkage, without a fluid coupling, between the engine and powershift transmission input. Tip-in clunk is especially acute in a parking-lot maneuver, in which a vehicle coasting at low speed is then accelerated in order to maneuver into a parking space.

In order to achieve good shift quality and to eliminate tip-in clunk, a powershift transmission should employ a control strategy that is different from that of a conventional automatic transmission. The control system should address the unique operating characteristics of a powershift transmission and include remedial steps to avoid the objectionable harshness yet not interfere with driver expectations and performance requirements of the powershift transmission. There is a need to eliminate shift harshness and noise associated with tip-in clunk in a powershift transmission.

For purposes of this disclosure, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling", "clutch" and "brake" may be used interchangeably.

A pocket plate may be provided with angularly disposed recesses or pockets about the axis of the one-way clutch. The pockets are formed in the planar surface of the pocket plate. Each pocket receives a torque transmitting strut, one end of which engages an anchor point in a pocket of the pocket plate. An opposite edge of the strut, which may hereafter be referred to as an active edge, is movable from a position within the pocket to a position in which the active edge extends outwardly from the planar surface of the pocket plate. The struts may be biased away from the pocket plate by individual springs.

A notch plate may be formed with a plurality of recesses or notches located approximately on the radius of the pockets of the pocket plate. The notches are formed in the planar surface of the notch plate.

Another example of an overrunning planar clutch is disclosed in U.S. Pat. No. 5,597,057.

Some U.S. patents related to the present invention include: U.S. Pat. Nos. 4,056,747; 5,052,534; 5,070,978; 5,449,057; 5,486,758; 5,678,668; 5,806,643; 5,871,071; 5,918,715; 5,964,331; 5,979,627; 6,065,576; 6,116,394; 6,125,980; 6,129,190; 6,186,299; 6,193,038; 6,386,349; 6,481,551; 6,505,721; 6,571,926; 6,814,201; 7,153,228; 7,275,628; 8,051,959; 8,196,724; and 8,286,772.

Yet still other related U.S. patents include: U.S. Pat. Nos. 4,200,002; 5,954,174; and 7,025,188.

U.S. Pat. No. 6,854,577 discloses a sound-dampened, one-way clutch including a plastic/steel pair of struts to dampen engagement clunk. The plastic strut is slightly longer than the steel strut. This pattern can be doubled to dual engaging. This approach has had some success. However, the dampening function stopped when the plastic parts became exposed to hot oil over a period of time.

Metal injection molding (MIM) is a metalworking process where finely-powdered metal is mixed with a measured amount of binder material to comprise a 'feedstock' capable of being handled by plastic processing equipment through a process known as injection mold forming. The molding process allows complex parts to be shaped in a single operation and in high volume. End products are commonly component items used in various industries and applications. The nature of MIM feedstock flow is defined by a science called rheology. Current equipment capability requires processing to stay limited to products that can be molded using typical volumes of 100 grams or less per "shot" into the mold. Rheology does allow this "shot" to be distributed into multiple cavities, thus becoming cost-effective for small, intricate, high-volume products which would otherwise be quite expensive to produce by alternate or classic methods. The variety of metals capable of implementation within MIM feedstock are referred to as powder metallurgy, and these contain the same alloying constituents found in industry standards for common and exotic metal applications. Subsequent conditioning operations are performed on the molded shape, where the binder material is removed and the metal particles are coalesced into the desired state for the metal alloy.

Other U.S. patent documents related to at least one aspect of the present invention includes U.S. Pat. Nos. 8,813,929; 8,491,440; 8,491,439; 8,286,772; 8,272,488; 8,187,141; 8,079,453; 8,007,396; 7,942,781; 7,690,492; 7,661,518; 7,455,157; 7,455,156; 7,451,862; 7,448,481; 7,383,930; 7,223,198; 7,100,756; and 6,290,044; and U.S. published application Nos. 2015/0000442; 2014/0305761; 2013/0277164; 2013/0062151; 2012/0152683; 2012/0149518; 2012/0152687; 2012/0145505; 2011/0233026; 2010/0105515; 2010/0230226; 2009/0233755; 2009/0062058; 2009/0211863; 2008/0110715; 2008/0188338; 2008/0185253; 2006/0124425; 2006/0249345; 2006/0185957; 2006/0021838; 2004/0216975; and 2005/0279602.

Some other U.S. patent documents related to at least one aspect of the present invention includes U.S. Pat. Nos. 8,720,659; 8,418,825; 5,996,758; 4,050,560; 8,061,496; 8,196,724; and U.S. published application Nos. 2014/0190785; 2014/0102844; 2014/0284167; 2012/0021862; 2012/0228076; 2004/0159517; and 2010/0127693.

A problem has arisen with some controllable one-way clutches (i.e. mechanical diodes (MD's)) which are meant to lock in one direction and lock or free wheel in the opposite direction, depending upon the position of a selector. In certain positions or locations, the clutch may not come out of a "lock-lock" condition (i.e. may inadvertently bind in both directions about the axis).

SUMMARY OF EXAMPLE EMBODIMENTS

An object of at least one embodiment of the present invention is to provide a controllable coupling assembly having forward and reverse backlash and which is prevented from inadvertently binding.

In carrying out the above object and other objects of at least one embodiment of the present invention, a controllable coupling assembly having forward and reverse backlash is provided. The assembly includes a plurality of forward locking elements. Each of the forward locking elements has a load-bearing surface. The assembly also includes at least one reverse locking element and first and second coupling members supported for relative rotation about a common rotational axis. The coupling members include a first coupling face having a set of forward pockets angularly spaced about the axis. Each of the forward pockets receives one of the forward locking elements and defines a forward load-bearing surface adapted for abutting engagement with the load-bearing surface of its respective forward locking element. The members also include a second coupling face which has a set of reverse locking formations adapted for abutting engagement with the at least one reverse locking element to prevent the relative rotation in a reverse direction about the axis and a third coupling face that opposes the first coupling face. The third coupling face has a set of forward locking formations. Each of the set of forward locking formations is adapted for abutting engagement with one of the forward locking elements to prevent the relative rotation in a forward direction about the axis. The number of forward locking elements is different than the number of reverse locking elements. The number of forward locking formations is different than the number of reverse locking formations. Either the forward backlash is a non-zero integer multiple of the reverse backlash or the reverse backlash is a non-zero integer multiple of the forward backlash to prevent the coupling assembly from inadvertently binding in both directions about the axis.

The assembly may further include a fourth coupling face that opposes the second coupling face. The fourth coupling face may have at least one reverse pocket. Each reverse pocket may receive a reverse locking element and may define a reverse load-bearing surface adapted for abutting engagement with a load-bearing surface of its respective reverse locking element.

The forward pockets may be grouped into at least one set wherein the forward pockets in each set are uniformly angularly spaced.

The forward pockets may be grouped into two or more sets.

The first coupling member may have the first and second coupling faces and the second coupling member may have the third coupling face.

The first coupling face may be oriented to face axially in a first direction along the axis, wherein the second coupling face may be oriented to face axially in a second direction opposite the first direction along the axis.

The forward and reverse locking elements may be locking struts.

The forward and reverse locking formation may be notches.

The first coupling member may be a splined ring.

The first and third coupling faces may be annular coupling faces that oppose each other.

The assembly may further include a plurality of reverse locking elements and a third coupling member having a fourth coupling face that opposes the second coupling face. The fourth coupling face may have a set of reverse pockets angularly spaced about the axis. Each of the reverse pockets may receive one of the reverse locking elements and defines a reverse load-bearing surface adapted for abutting engagement with a load-bearing surface of its respective reverse locking element.

The reverse pockets may be grouped into at least one set wherein the reverse pockets in each set are uniformly angularly spaced.

The reverse pockets may be grouped into two or more sets.

The assembly may further include a control member mounted for controlled, shifting movement between the second and fourth coupling faces relative to the set of reverse pockets and operable for controlling position of the reverse locking elements. The control member allows at least one of the reverse locking elements to engage at least one of the reverse locking formations in a first position of the control member wherein the control member maintains the reverse locking elements in their pockets in a second position of the control member.

The control member may comprise a slide plate controllably rotatable about the rotational axis between the first and second positions.

The assembly may further include a control element coupled to the control member to controllably shift the control member.

The assembly may further include a generally round snap ring that is received by an annular groove in the third coupling member to retain the members together and prevent axial movement of the members relative to one another.

Further in carrying out the above object and other objects of at least one embodiment of the present invention, a controllable clutch assembly having forward and reverse backlash is provided. The assembly includes a plurality of forward locking elements. Each of the forward locking elements has a load-bearing surface. The assembly also includes at least one reverse locking element and first and second clutch members supported for relative rotation about a common rotational axis. The clutch members include a first coupling face having a set of forward pockets angularly spaced about the axis. Each of the forward pockets receives one of the forward locking elements and defines a forward load-bearing surface adapted for abutting engagement with the load-bearing surface of its respective forward locking element. The members also include a second coupling face which has a set of reverse locking formations adapted for abutting engagement with the at least one reverse locking element to prevent the relative rotation in a reverse direction about the axis and a third coupling face that opposes the first coupling face. The third coupling face has a set of forward locking formations. Each of the set of forward locking formations is adapted for abutting engagement with one of the forward locking elements to prevent the relative rotation in a forward direction about the axis. The number of forward locking formations is different than the number of reverse locking formations. Either the forward backlash is a non-zero integer multiple of the reverse backlash or the reverse backlash is a non-zero integer multiple of the forward backlash to prevent the coupling assembly from inadvertently binding in both directions about the axis. The forward pockets are grouped into at least one set wherein the forward pockets in each set are uniformly angularly spaced.

The forward pockets may be grouped into two or more sets.

Yet still further in carrying out the above object and other objects of at least one embodiment of the present invention, a controllable coupling assembly having forward and reverse backlash is provided. The assembly includes a plurality of forward locking elements. Each of the forward locking elements has a load-bearing surface. The assembly also includes a plurality of reverse locking elements. Each of the reverse locking elements has a load-bearing surface. The assembly further includes first, second and third coupling members supported for relative rotation about a common rotational axis. The coupling members have a first coupling face with a set of forward pockets angularly spaced about the axis. Each of the forward pockets receives one of the forward locking elements and defines a forward load-bearing surface adapted for abutting engagement with the load-bearing surface of its respective forward locking element. The members also have a second coupling face with a set of reverse locking formations. Each of the set of reverse locking formations are adapted for abutting engagement with one of the reverse locking elements to prevent the relative rotation in a reverse direction about the axis. A third coupling face opposes the first coupling surface. The third coupling face has a set of forward locking formations. Each of the set of forward locking formations is adapted for abutting engagement with one of the forward locking elements to prevent the relative rotation in a forward direction about the axis. A fourth coupling face opposes the second coupling face. The fourth coupling face has a set of reverse pockets angularly spaced about the axis. Each of the reverse pockets receives one of the reverse locking elements and defines a reverse load-bearing surface adapted for abutting engagement with a load-bearing surface of its respective reverse locking element. The number of forward locking elements is different than the number of reverse locking elements. The number of forward locking formations is different than the number of reverse locking formations. Either the forward backlash is a non-zero integer multiple of the reverse backlash or the reverse backlash is a non-zero integer multiple of the forward backlash to prevent the coupling assembly from inadvertently binding in both directions about the axis.

The reverse pockets may be grouped into at least one set wherein the reverse pockets in each set are uniformly angularly spaced.

The above object and other objects, features, and advantages of the present invention are readily apparent from the following detailed description of the best mode for carrying out the invention when taken in connection with the accompanying drawings and in view of the prior art.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
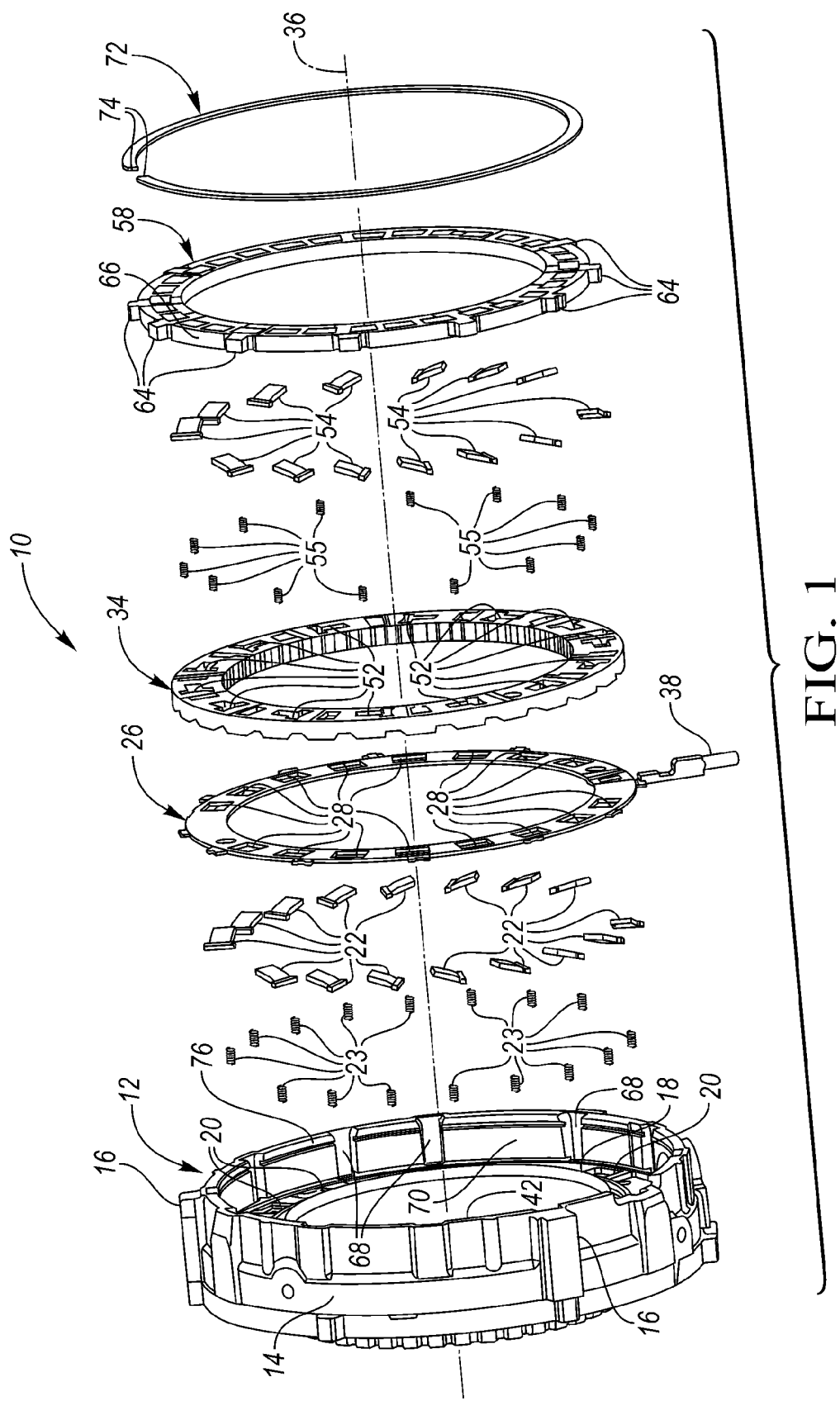
FIG. 1 is an exploded perspective view of a controllable clutch or coupling assembly constructed in accordance with one embodiment of the present invention.
Figure 2:
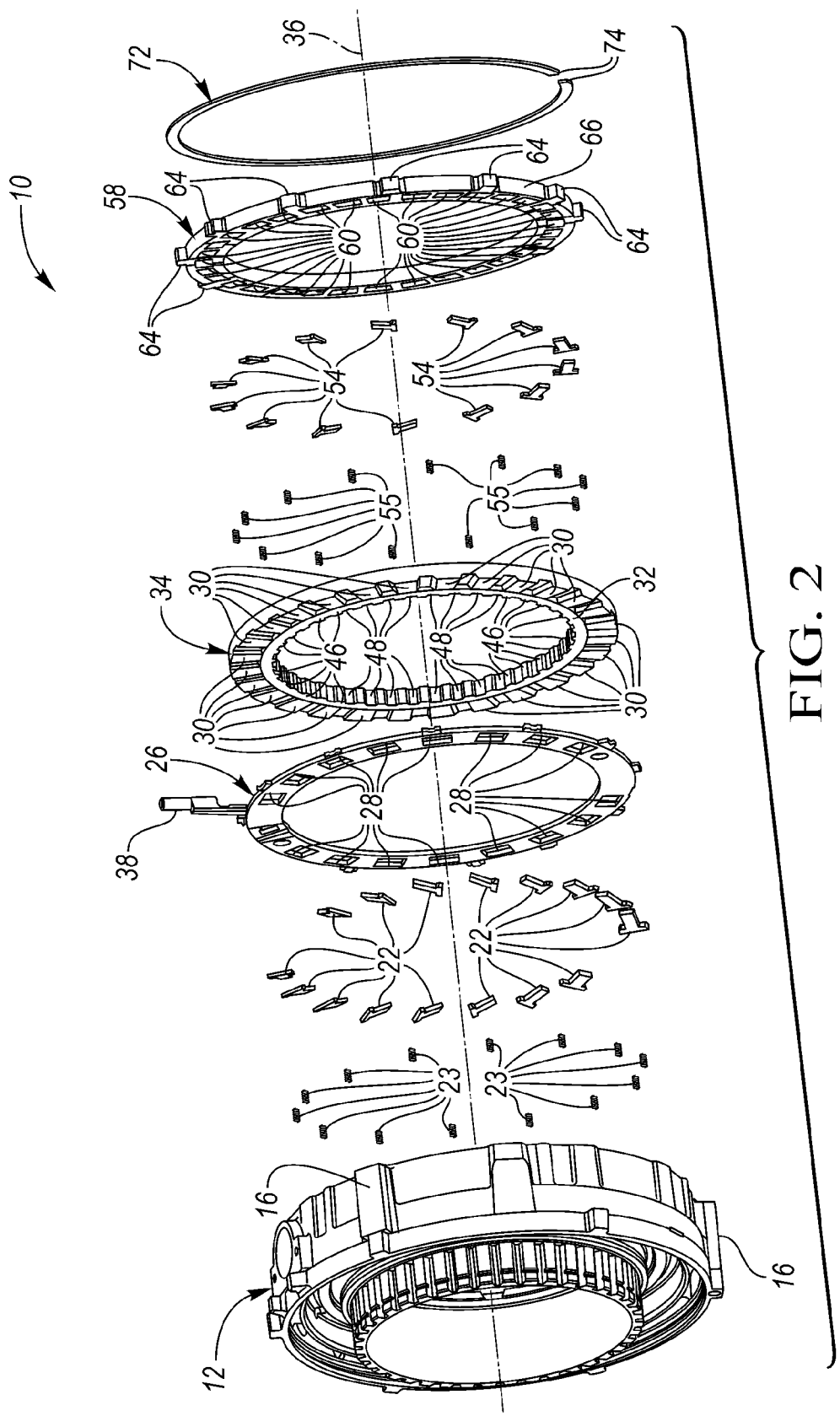
FIG. 2 is a view similar to the view of FIG. 1 but taken from a different direction to illustrate the bottom surfaces of the assembly.

Referring now to the drawing figures, FIGS. 1 and 2 are exploded perspective views (taken from different directions to illustrate different surfaces of the components of the assembly) of a controllable one-way clutch or coupling assembly, generally indicated at 10, and constructed in accordance with one embodiment of the present invention. The assembly 10 includes an annular reverse pocket plate or first outer coupling member, generally indicated at 12. An outer axially-extending surface 14 of the plate 12 has external splines 16 for coupling the plate 12 to the inner surface of a transmission case (not shown). An inner radially extending surface or coupling face 18 of the plate 12 is formed with spaced pockets 20 in which reverse struts 22 are pivotally biased outwardly by coil springs 27. Preferably, sixteen reverse struts 22 are provided. However, it is to be understood that a greater or lesser number of reverse struts may be provide as will be described in greater detail herein below.

The assembly 10 also includes a control member or selector slide plate, generally indicated at 26, having a plurality of spaced apertures 28 extending completely therethrough to allow the reverse struts 22 to pivot in their pockets 20 and extend through the apertures 28 to engage spaced locking formations or ramped reverse notches 30 formed in a radially extending surface or coupling face 32 (FIG. 2) of an inner pocket plate or coupling member, generally indicated at 34, when the plate 26 is properly angularly positioned about a common central rotational axis 36 by a shift fork or control element 38 which extends through a notch or slot (not shown) formed through an outer circumferential end wall 42 of the plate 12. Preferably, 28 reverse notches are provided. However, it is to be understood that a greater or lesser number of reverse notches may be provided as will be described in greater detail herein below.

The fork 38 is secured or coupled to the control plate 26 so that movement of the fork 38 in the slot between different angular positions causes the plate 26 to slide or shift between its control positions to alternately cover or uncover the struts 22 (i.e., to engage or disengage the reverse struts 22, respectively).

The plate 34 preferably comprises a splined ring having internal splines 46 formed at its inner axially extending surfaces 48 (FIG. 2). A radially extending surface or coupling face spaced from the surface 32 of the plate 34 has a plurality of spaced pockets 52 (FIG. 1) formed therein to receive a plurality of forward struts 54 therein which are pivotally biased by corresponding coil springs 55. Preferably, fourteen forward struts 54 are provided. However, it is to be understood that a greater or lesser number of forward struts may be provided as will be described in greater detail herein below.

Referring collectively to FIGS. 1 and 2, assembly 10 also includes a second outer coupling member or notch plate, generally indicated at 58, which has a plurality of locking formations, cams or notches 60 formed in a radially extending surface or coupling face thereof by which the forward struts 54 lock the plate 34 to the notch plate 58 in one direction about the axis 36 but allow free-wheeling in the opposite direction about the axis 36. Preferably, thirty two forward notches are provided. However, it is to be understood that a greater or lesser number of forward notches may be provided as will be described in greater detail herein below.

The notch plate 58 includes external splines 64 which are formed on an outer axial surface 66 of the plate 58 and which are received and retained within axially extending recesses 68 formed within an inner axially extending surface 70 of the end wall 42 of the plate 12 (FIG. 1).

As shown in FIG. 1, the assembly 10 further includes a snap ring, generally indicated at 72, having end portions 74 and which fits within an annular groove 76 formed within the inner surface 70 of the end wall 42 of the plate 12 to hold the plates 12, 26, 34 and 58 together and limit axial movement of the plates relative to one another.

The shift fork 38, in one control position of its control positions, disengages the reverse struts 22. The shift fork 38 is rotated about 7° in a forward overrun direction about the axis 36 to rotate the selector plate 26 to, in turn, allow the reverse struts 22 to move from their disengaged positions in their pockets 20 to their engaged positions with the notches 30.

As previously mentioned, many clutch assemblies (such as the assembly 10 described in FIGS. 1 and 2 as well as the assemblies 300 and 400 described herein below with respect to FIGS. 3 and 4, respectively) are meant to lock in one direction and lock or free wheel in the opposite direction depending on the position of its selector or selector plate. In certain clutch locations, the clutch assembly would not come out of a "lock-lock" condition (i.e. would inadvertently bind in both directions about the rotational axis). This is due to the transitional backlash (i.e. distance the clutch can move between forward and reverse directions) was extremely low. This extremely low transitional backlash did not allow the locking elements or struts to drop out of their locking or binding position upon command thereby resulting in the "lock-lock" condition.

It was discovered for clutch assemblies having: 1) the number of forward locking elements different than the number of reverse locking elements; 2) the number of forward locking formations different than the number of reverse locking formations; and 3) either the forward backlash is a non-zero integer multiple of the reverse backlash or the reverse backlash is a non-zero integer multiple of the forward backlash that the coupling or clutching assembly was prevented from inadvertently binding in both directions about the rotational axis of its assembly.

When the above noted conditions are satisfied, the number of forward and reverse locking elements and the number of forward and reverse locking formations can be selected, so that minimum transitional backlash is substantially equal in all positions. The following table illustrates example possible combinations of forward and reverse locking elements (struts) and forward and reverse locking formations (notches):

| Entry # | Forward Notches | Forward Struts | Single/Dual Strut Engagement | Forward Resolution (deg) | Reverse Notches | Reverse Struts | Single/Dual Strut Engagement | Reverse Resolution (deg) | n | Function without tie-up? |
|---|---|---|---|---|---|---|---|---|---|---|
| 1 | 36 | 14 | Dual | 1.4276 | 84 | 1 | Single | 4.2857 | 3 | Yes |
| 2 | 32 | 14 | Dual | 1.6071 | 28 | 16 | Dual | 1.6071 | 1 | Yes |
| 3 | 24 | 14 | Dual | 2.1429 | 28 | 12 | Dual | 2.1429 | 1 | Yes |
| 4 | 26 | 18 | Dual | 1.5385 | 78 | 1 | Single | 4.6154 | 3 | Yes |
| 5 | 32 | 14 | Dual | 1.6071 | 112 | 1 | Single | 3.2143 | 2 | Yes |
| 6 | 38 | 12 | Dual | 1.5789 | 36 | 10 | Dual | 2.0000 | 1.267 | No |
| 7 | 34 | 12 | Dual | 1.7647 | 26 | 14 | Dual | 1.9780 | 1.121 | No |

Entry #2 is represented in FIGS. 1 and 2. Entries 6 and 7 are examples of coupling assemblies which would experience the "lock-lock" or binding condition. The type of "engagement" (either "single" or "dual") indicates either a single or two struts provide the locking function in one of the directions of rotation.

Figure 3:
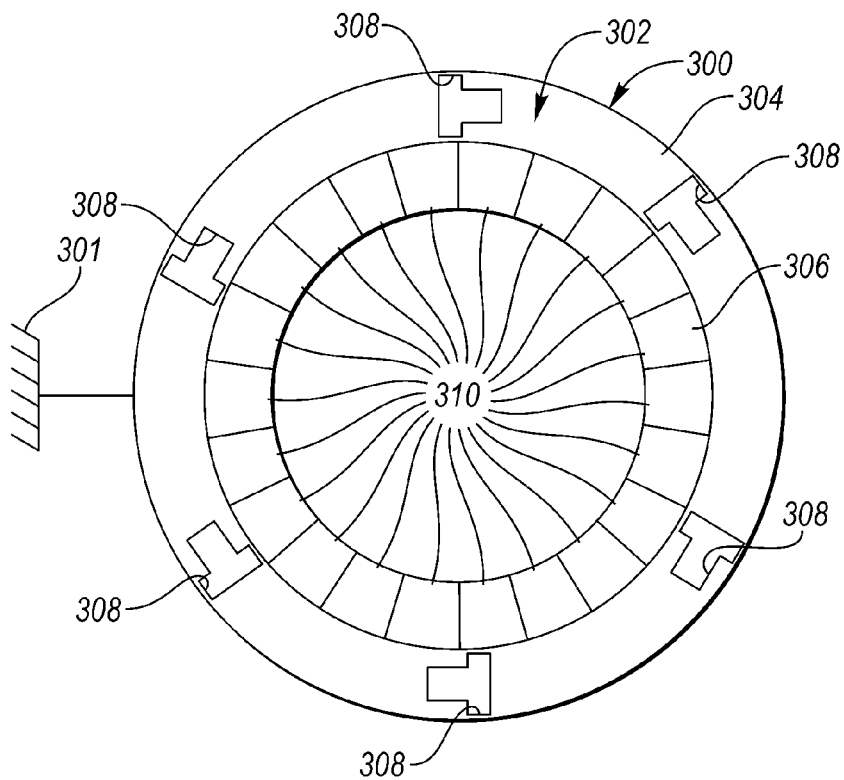
FIG. 3 is a top plan view of a coupling member of another embodiment.
Figure 4:
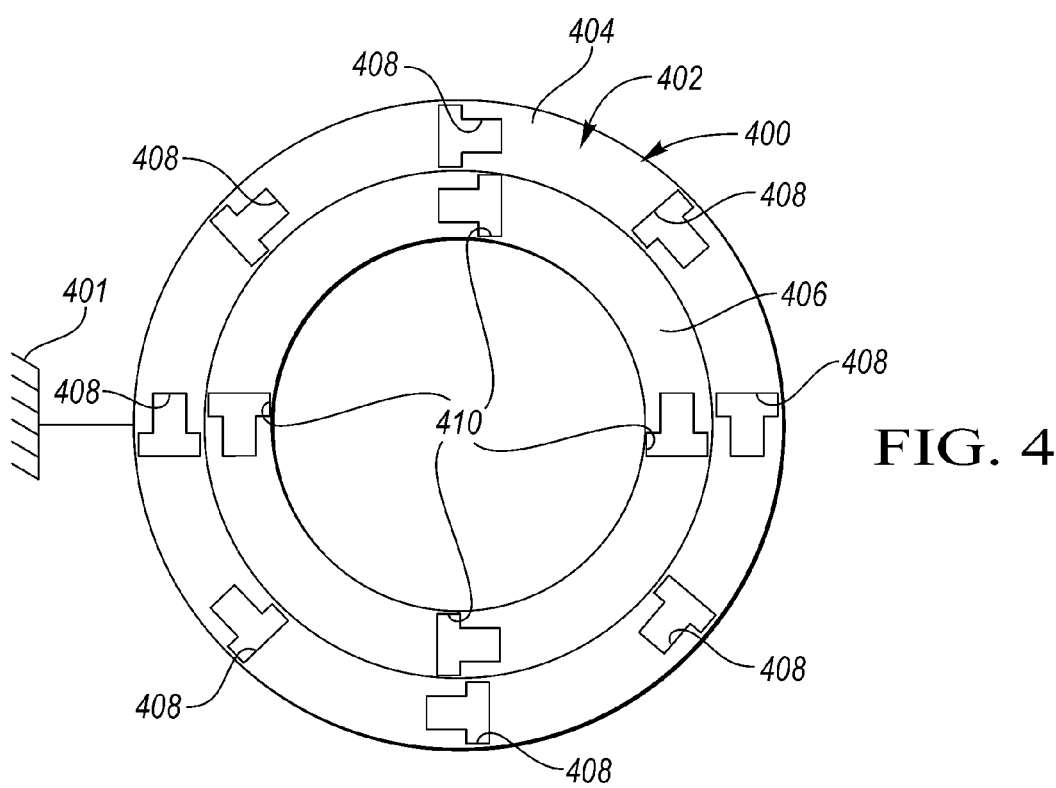
FIG. 4 is a top plan view of a coupling member of yet another embodiment.

The above-noted discovery is applicable to any controllable ratcheting clutch assembly both radial and planar configurations such as the configurations shown in FIGS. 3 and 4. FIG. 3 shows a planar concentric configuration of an assembly, generally indicated at 300, including a reverse member or plate, generally indicated at 302, which is grounded at 301. The plate 302 has an outer surface or coupling face 304 with reverse struts (not shown) in reverse pockets 308 and an inner surface or coupling face 306 with forward notches 310. The opposing clutch member which has the forward pockets and struts, coupling faces, and the corresponding reverse notches is not shown for simplicity. The resulting assembly 300 is a dual engagement assembly having 6 reverse pockets, 44 reverse notches (not shown), a reverse backlash of 2.727, 12 forward pockets (not shown), 22 forward notches, a forward backlash of 2.727° and a transitional backlash of 1.364°.

FIG. 4 shows a second planar concentric coupling assembly, generally indicated at 400, including a reverse coupling member or plate, generally indicated at 402, which is grounded at 401. The plate 402 has an outer surface or coupling face 404 with reverse struts (not shown) in reverse pockets 408 and an inner surface or coupling face 406 with forward struts (not shown) in forward pockets 410. The opposing coupling member or plate (not shown for simplicity) has corresponding coupling faces and forward and reverse locking formations. The resulting assembly 400 is a single engagement assembly having 8 reverse pockets (and struts), 25 reverse notches (not shown), a reverse backlash of 1.8°, 4 forward pockets (and struts), 50 forward notches (not shown), a forward backlash of 1.8° and a transitional backlash of 0.9°.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A controllable coupling assembly having forward and reverse backlash, the assembly comprising:
    a plurality of forward locking elements, each of the forward locking elements having a load-bearing surface;
    at least one reverse locking element; and
    first and second coupling members supported for relative rotation about a common rotational axis, the coupling members including:
        a first coupling face having a set of forward pockets angularly spaced about the axis, each of the forward pockets receiving one of the forward locking elements and defining a forward load-bearing surface adapted for abutting engagement with the load-bearing surface of its respective forward locking element;
        a second coupling face having a set of reverse locking formations adapted for abutting engagement with the at least one reverse locking element to prevent the relative rotation in a reverse direction about the axis; and
        a third coupling face that opposes the first coupling face, the third coupling face having a set of forward locking formations, each of the set of forward locking formations being adapted for abutting engagement with one of the forward locking elements to prevent the relative rotation in a forward direction about the axis, wherein the number of forward locking elements is different than the number of reverse locking elements, wherein the number of forward locking formations is different than the number of reverse locking formations and wherein either the forward backlash is a non-zero integer multiple of the reverse backlash or the reverse backlash is a non-zero integer multiple of the forward backlash to prevent the coupling assembly from inadvertently binding in both directions about the axis.

2. The assembly as claimed in claim 1, further comprising a fourth coupling face that opposes the second coupling face, the fourth coupling face having at least one reverse pocket, each reverse pocket receiving a reverse locking element and defining a reverse load-bearing surface adapted for abutting engagement with a load-bearing surface of its respective reverse locking element.

3. The assembly as claimed in claim 1, wherein the forward pockets are grouped into at least one set and wherein the forward pockets in each set are uniformly angularly spaced.

4. The assembly as claimed in claim 3, wherein the forward pockets are grouped into two or more sets.

5. The assembly as claimed in claim 1, wherein the first coupling member has the first and second coupling faces and the second coupling member has the third coupling face.

6. The assembly as claimed in claim 1, wherein the first coupling face is oriented to face axially in a first direction along the axis, and wherein the second coupling face is oriented to face axially in a second direction opposite the first direction along the axis.

7. The assembly as claimed in claim 1, wherein the forward and reverse locking elements are locking struts.

8. The assembly as claimed in claim 1, wherein the forward and reverse locking formations are notches.

9. The assembly as claimed in claim 1, wherein the first coupling member is a splined ring.

10. The assembly as claimed in claim 1, wherein the first and third coupling faces are annular coupling faces that oppose each other.

11. The assembly as claimed in claim 1, further comprising a plurality of reverse locking elements and a third coupling member having a fourth coupling face that opposes the second coupling face, the fourth coupling face having a set of reverse pockets angularly spaced about the axis, each of the reverse pockets receiving one of the reverse locking elements and defining a reverse load-bearing surface adapted for abutting engagement with a load-bearing surface of its respective reverse locking element.

12. The assembly as claimed in claim 11, wherein the reverse pockets are grouped into at least one set and wherein the reverse pockets in each set are uniformly angularly spaced.

13. The assembly as claimed in claim 12, wherein the reverse pockets are grouped into two or more sets.

14. The assembly as claimed in claim 11, further comprising:
    a control member mounted for controlled, shifting movement between the second and fourth coupling faces relative to the set of reverse pockets and operable for controlling position of the reverse locking elements, the control member allowing at least one of the reverse locking elements to engage at least one of the reverse locking formations in a first position of the control member and wherein the control member maintains the reverse locking elements in their pockets in a second position of the control member.

15. The assembly as claimed in claim 14, wherein the control member comprises a slide plate controllably rotatable about the rotational axis between the first and second positions.

16. The assembly as claimed in claim 14, further comprising a control element coupled to the control member to controllably shift the control member.

17. The assembly as claimed in claim 11, wherein the assembly further comprises:
a generally round snap ring that is received by an annular groove in the third coupling member to retain the members together and prevent axial movement of the members relative to one another.

18. A controllable clutch assembly having forward and reverse backlash, the assembly comprising:
a plurality of forward locking elements, each of the forward locking elements having a load-bearing surface;
at least one reverse locking element; and
first and second clutch members supported for relative rotation about a common rotational axis, the clutch members including:
a first coupling face having a set of forward pockets angularly spaced about the axis, each of the forward pockets receiving one of the forward locking elements and defining a forward load-bearing surface adapted for abutting engagement with the load-bearing surface of its respective forward locking element;
a second coupling face having a set of reverse locking formations adapted for abutting engagement with the at least one reverse locking element to prevent the relative rotation in a reverse direction about the axis; and
a third coupling face that opposes the first coupling face, the third coupling face having a set of forward locking formations, each of the set of forward locking formations being adapted for abutting engagement with one of the forward locking elements to prevent the relative rotation in a forward direction about the axis, wherein the number of forward locking elements is different than the number of reverse locking elements, wherein the number of forward locking formations is different than the number of reverse locking formations, wherein either the forward backlash is a non-zero integer multiple of the reverse backlash or the reverse backlash is a non-zero integer multiple of the forward backlash to prevent the coupling assembly from inadvertently binding in both directions about the axis, wherein the forward pockets are grouped into at least one set and wherein the forward pockets in each set are uniformly angularly spaced.

19. The assembly as claimed in claim 18, wherein the forward pockets are grouped into two or more sets.

20. A controllable coupling assembly having forward and reverse backlash, the assembly comprising:
a plurality of forward locking elements, each of the forward locking elements having a load-bearing surface;
a plurality of reverse locking elements, each of the reverse locking elements having a load-bearing surface; and
first, second and third coupling members supported for relative rotation about a common rotational axis, the coupling members including:
a first coupling face having a set of forward pockets angularly spaced about the axis, each of the forward pockets receiving one of the forward locking elements and defining a forward load-bearing surface adapted for abutting engagement with the load-bearing surface of its respective forward locking element;
a second coupling face having a set of reverse locking formations, each of the set of reverse locking formations being adapted for abutting engagement with one of the reverse locking elements to prevent the relative rotation in a reverse direction about the axis;
a third coupling face that opposes the first coupling surface, the third coupling face having a set of forward locking formations, each of the set of forward locking formations being adapted for abutting engagement with one of the forward locking elements to prevent the relative rotation in a forward direction about the axis; and
a fourth coupling face that opposes the second coupling face, the fourth coupling face having a set of reverse pockets angularly spaced about the axis, each of the reverse pockets receiving one of the reverse locking elements and defining a reverse load-bearing surface adapted for abutting engagement with a load-bearing surface of its respective reverse locking element wherein the number of forward locking elements is different than the number of reverse locking elements, wherein the number of forward locking formations is different than the number of reverse locking formations and wherein either the forward backlash is a non-zero integer multiple of the reverse backlash or the reverse backlash is a non-zero integer multiple of the forward backlash to prevent the coupling assembly from inadvertently binding in both directions about the axis.

21. The assembly as claimed in claim 20, wherein the reverse pockets are grouped into at least one set and wherein the reverse pockets in each set are uniformly angularly spaced.

* * * * *